United States Patent [19]

Gorin et al.

[11] Patent Number: 5,225,632

[45] Date of Patent: Jul. 6, 1993

[54] SPACE UTILITY CONDUIT

[75] Inventors: Barney F. Gorin, Frederick; Michael J. McLay, Rockville, both of Md.

[73] Assignee: Fairchild Space and Defense Corporation, Germantown, Md.

[21] Appl. No.: 577,552

[22] Filed: Sep. 5, 1990

[51] Int. Cl.⁵ .......................... H01B 7/00; F16L 3/22; B64G 1/10
[52] U.S. Cl. ..................................... 174/47; 174/68.1; 138/107; 244/159
[58] Field of Search ................... 174/47, 21 R, 21 JS, 174/21 JR, 21 JC, 21 C, 21 CA, 24, 68.1; 244/158, 135 R, 173; 138/DIG. 8, DIG. 11, 106, 107, 103, 155, 177, 178

[56] References Cited

U.S. PATENT DOCUMENTS 4,683,944  8/1987  Curlett ............................. 174/47 X
4,728,060  3/1988  Cohen ................................. 244/159

Primary Examiner—Leo P. Picard
Assistant Examiner—Hyung S. Sough
Attorney, Agent, or Firm—Michael W. York

[57] ABSTRACT

A space utility conduit for use in space structures such as space stations. The space utility conduit includes a plurality of substantially identical interconnectable conduit segments or modules. Each module contains a plurality of utility lines for transporting a fluid or electricity or the like throughout the space structure. The modules have a lazy S-shape that enables them to be easily installed and removed from the space structure. The S-shaped module is rotatably connected to the space structure prior to it being connected to adjacently located modules. A module is also provided that allows access to the utility lines through a connector or port that is connectable to a connector located exterior to the space structure.

13 Claims, 2 Drawing Sheets

SPACE UTILITY CONDUIT

BACKGROUND OF THE INVENTION

Space stations and similar space structures will require a large number of utility lines to connect such things as the solar arrays and solar dynamic power generating equipment, the habitable modules, the attached payloads and the customer servicing facility with each other and other space station elements. The utilities involved include the data management system, the power distribution system and the thermal subsystem. It is also possible that the integrated water system, the integrated nitrogen system and the integrated waste fluid system will also be routed through the utility system.

The process of installing utility lines in a large space structure such as the space station can be expected to be a time consuming and difficult one. It would involve several steps. The first step would be the installation of a supporting structure or cable tray. The installation of this structure will require its attachment to the space station truss as well as the physical attachment of each section of tray to the immediately adjacent tray sections. The materials from which the tray is manufactured and its layout in the truss will have to consider the effects of differential thermal expansion and contraction between the tray and the truss. The tray will also have to provide micrometeorite protection to the internal wires, optical fibers and fluid lines.

This operation will then be followed by the installation of the required utility lines. In the case of the space station, the number of different lines is significant. The entire truss structure must be serviced by power and signal lines. In addition, the active thermal control system is routed throughout the truss. In some areas, the water, the nitrogen and one or more of the waste lines are also required. The fibre optic and electrical cables involved are likely to be either relatively large diameter bundles of wire or fibre or very numerous. The fluid lines will require a large number of individual connections between segments.

A very significant additional problem exists in verifying that the installation is satisfactory. Acceptance testing of the completed line will be difficult unless specific provisions are made for isolating problem areas. Some tests, such as certain testing of the electrical lines, may be impossible within the assets available in situ. As a result, of the complexity and criticality of the utility system, its installation may become very labor intensive. The problems of access to the worksite and the variety of operations involved will make installation of a utility system of this type difficult for the flight telerobotic servicer. Given the difficulty of operations where a cumbersome space suit is required and no gravity exists to allow "muscling" a stiff line into place, it is entirely possible that the installation of the utility lines could become a "long pole" in the process of reaching the goal of an operational space station.

The difficulty involved in utility installation will also be increased in those areas where service ports or line branches are required as this will require the installation of specialized fittings and/or connectors. These areas are likely to become workmanship "problem areas" with major leakage potential. As a result, each of the fittings involved will have to be individually tested. Perhaps an even more important factor than the original assembly is the eventual need to repair the utility system. This will necessitate removing and replacing damaged or failed systems in the line. To accomplish this, the system must be capable of disassembly. This must take place in the specific areas where failures have occured and not require complete removal of the system.

In view of these problems associated with utility lines in space structures, a very definite need exists for a simple and effective space utility conduit. This invention provides such an effective space utility conduit. With this invention the space utility conduit consists of a series of identical or substantially identical conduit sections with a configuration or shape that makes them easy to install and remove in space. This configuration also allows the same conduit section to be used in a multitude of various places within the space structure. This conduit carries all of the required utility lines and its configuration allows simultaneous or nearly simultaneous connection of these utility lines in space.

SUMMARY OF THE INVENTION

This invention relates to utility lines for vehicles or structures and more particularly to utility lines for space structures.

It is accordingly an object of the invention to provide a utility conduit that is particularly adapted for use in space.

It is also an object of the invention to provide a space utility conduit that is easy to install in space.

It is also an object of the invention to provide a space utility conduit that is easy to transport into space.

It is also an object of the invention to provide a space utility conduit that is easy to manufacture.

It is an object of the invention to provide a space utility conduit that lends itself to be easily used in a wide variety of types of space structures.

It is an object of the invention to provide a space utility conduit that can be used at various different locations within a space structure.

It is an object of the invention to provide a space utility conduit that incorporates a plurality of space utility lines.

It is also an object of the invention to provide a space utility conduit that includes a plurality of substantially identical conduit segments.

It is also an object of the invention to provide a space utility conduit that is easy to service.

It is also an object of the invention to provide a space utility conduit that can remain connected to the space structure during servicing or testing.

It is also an object of the invention to provide a space utility conduit that uses the space structure itself to assist in its installation.

It is also an object of the invention to provide a space utility conduit which provides protection from micrometeorites.

These and other objects are provided by this space utility conduit invention that includes a plurality of substantially identical conduit segments or sections or modules. Each module contains a plurality of types of utility lines inside it and the modules are configured so that they can be readily connected together in such a manner that all of the utility lines are connected when the modules are connected. Each module has provision for connecting it to the space structure prior to the module being connected to another module to assist in connecting the modules together in space.

BRIEF DESCRIPTION OF THE DRAWINGS

The invention will be hereinafter more fully described with reference to the acompanying drawings in which.

DETAILED DESCRIPTION OF THE PREFERRED EMBODIMENT

Figure 1:
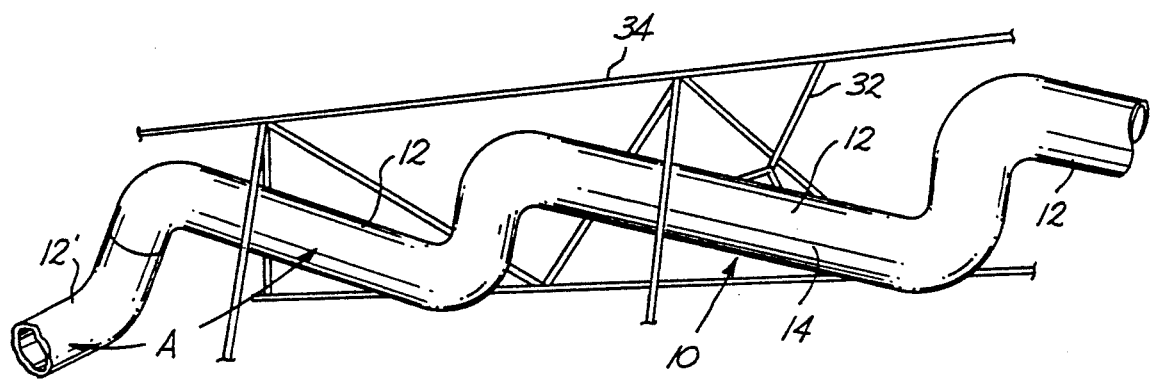
FIG. 1 is a perspective view of the space utility conduit invention located within a space structure.
Figure 2:
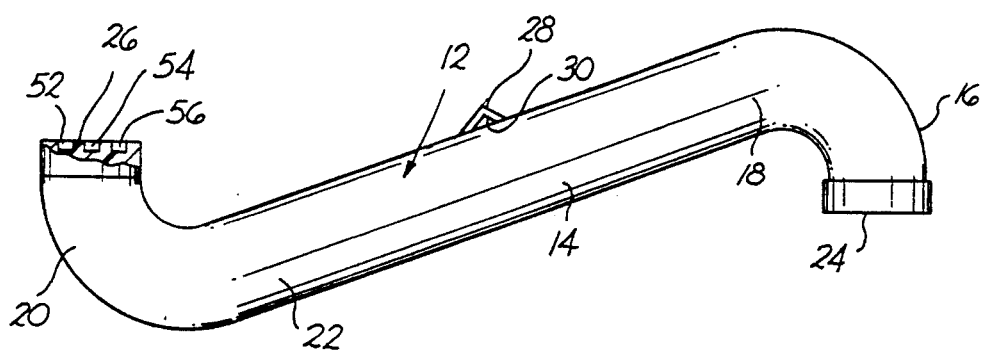
FIG. 2 is a side elevational view of a module that forms part of the space utlilty conduit illustrated in FIG. 1.
Figure 3:
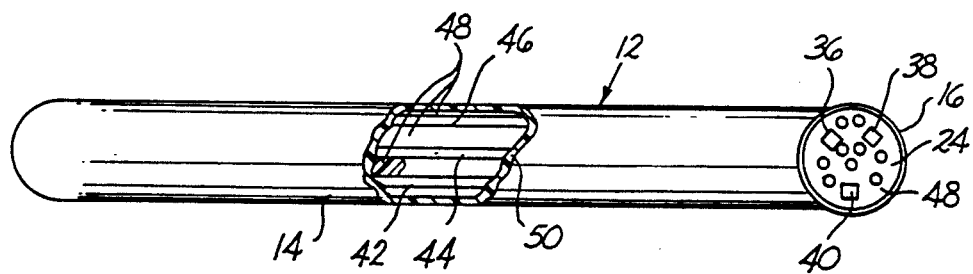
FIG. 3 is a bottom plan view of the module illustrated in FIG. 2.

Referring first to FIG. 1, the space utility conduit invention is illustrated and is designated generally by the number 10. The space utility conduit 10 comprises a series of substantially identical interconnected conduit modules or segments 12 that are connected together in end to end relationships. As best illustrated in FIGS. 2 and 3, each module 12 comprises a substantially straight cylindrical central portion 14. A generally elbow shaped end portion 16 is located on one end portion 18 of the central portion 14 and another generally elbow shaped end portion 20 is located on the other end portion 22 of the central portion 14. The end portions 16 and 20 have respective open ends 24 and 26 that face in substantially opposite directions.

The central portion 14 of each conduit module 12 has a stabilizer attachment projection 28 that has a generally centrally located aperture 30. This projection 28 with its aperture 30 is pivotally connected to an elongated connecting member 32 that is in turn connected to a space structure 34 that can be part of a space station or the like. Only a part of this space station or the like is illustrated since in itself it is a structure known in the art.

As illustrated in FIG. 3, where the end 24 of the elbow portion 16 is shown, the end 24 has a plurality of different types of connectors located in it. These connectors are a liquid connector 36, electrical connector 38 and a gas connector 40. These connectors 36, 38 and 40 are connected to the respective liquid line 42, electrical line 44 and gas line 46 located within and extending through the module 12. Of course, additional utility lines and suitable connectors could be located in the module 12. A micrometeorite shielding material 48 is located within the outer shell 50 of the module 12 and surrounds the connectors 36, 38, 40 and the respective utility lines 42, 44 and 46 to protect them from damage due to micrometeorites. This shielding material 48 can comprise a suitable tough fiberglass impregnated material or a penetration resistant material such as Kevlar.

These connectors 36, 38, and 40 and their connected lines 42, 44, and 46 are known in the art and hence need not be described. However, it should be understood that if the connectors 36, 38, and 40 are female type connectors, then the respective connectors 52, 54 and 56 that are located in the end 26 of the elbow shaped portion 20 and are connected to the opposite end of the respective liquid line 42, electrical line 44 and gas line 46 are compatable male type connectors that are adapted to be insertable into the respective connectors 36, 38 and 40. These connectors 36, 38, 40 and the corresponding connectors 52, 54 and 56 are sized, shaped and located so that they cannot be inadvertently connected to a non-compatible connector.

Figure 4:
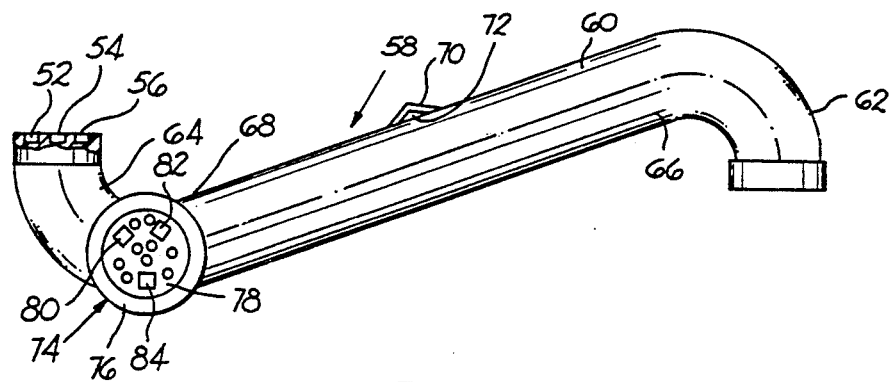
FIG. 4 is a side elevational view of a different module that can be used with the module illustrated in FIGS. 2 and 3.
Figure 5:
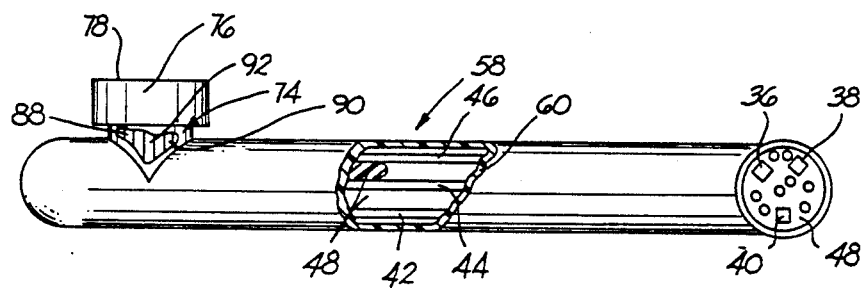
FIG. 5 is a bottom plan view of the module illustrated in FIG. 4.

At various locations within the space structure such as that designated 34, with only a portion shown, it will be necessary to gain access to at least some of the utility lines 42, 44 and 46. These locations can comprise utility ports for the attachment of external payloads to the space structure 34. To provide such ports, a modified module is incorporated into the conduit apparatus 10. This modified module is illustrated in FIGS. 4 and 5 and is designated generally by the number 58. The conduit module or segment 58 contains all the basic structure of the previously described conduit module 12 including a substantially straight cylindrical central portion 60 that is substantially identical to the previously described central portion 14. The module 58 also has respective generally elbow shaped end portions 62 and 64 located on the respective end portions 66 and 68 of the central portion 14 that are similar to the previously described elbow shaped end portions 16 and 20. This module 58 also contains the previously described connectors 36, 38 and 40 that are connected to lines 42, 44 and 46 which are in turn connected to connectors 52, 54 and 56. The interior of the module 58 also has the shielding material 48. The module 58 also has a stabilizer attachment projection 70 with its aperture 72 that is substantially identical to the previously described projection 28 and aperture 30.

The module 58 differs in one very important respect from the module 12 since a generally cylindrical shaped projection 74 extends outward from one side of the module 58 near the junction of its substantially straight portion 60 and the elbow shaped end portion 64. A generally cylindrical shaped connector 76 is connected to the outer end portion of the projection 74. This connector 76 is sized and shaped to be connected to a suitable utility servicing connector (not shown) located exterior to the space structure 34. The outer end 78 of the conenctor 76 has respective individual liquid, electrical and gas connectors 80, 82 and 86 that are in turn connected to respective liquid, electrical and gas conduits 88, 90 and 92 located within the projection 74 that are in turn connected to the respective liquid, electrical and gas conduits 42, 44 and 46. In view of this arrangement access to the respective liquid, electrical, and gas conduits 42, 44 and 46 is made possible through the respective liquid, electrical and gas connectors 80, 82 and 84 located in the connector 76. The module 58 is adapted to be interconencted at desired locations with the modules 12 in a manner that will hereinafter be described in detail.

FIG. 1 illustrates a variation of the module 12 that permits the utility conduit 10 to make large bends or turns. As illustrated, the utility conduit 10 includes a module designated 12' that is connected to a module 12 in such a manner that a substantial acute angle A exists between the central axes of these modules. This module 12' is substantially identical to the module 12 and it contains all of the same previously described components. The only difference between the modules 12 and 12' is that the connectors 52, 54, and 56 and adjacent connected poritons of respective conduits 42, 44 and 46 are rotated within the elbow shaped portion 20 of the module 12' This permits the angular relationship A between the adjacent connected conduit modules 12' and 12.

The space utility conduit 10 is made and used in the following manner. Each module 12 and 58 must be made from space compatable materials since it is designed for use in space. The particular type of materials may be dictated by the particular type of space environment that is expected and will be known to those skilled in the art. In the preferred embodiment the respective exterior shells 50 and 60 of the modules 12 and 58 should be made from a suitable Kevlar or composite material. In the case of the modules 58 the cylindrical projection 74 should also be made from the same Kevlar or composit material. As previously indicated, the micrometeorite shielding 48 can comprise Kevlar or a similar suitable material known in the art. The various connectors 36, 38, 40, 52, 54, 56, 80, 82 and 84 and the associated conduits 42, 44, 46, 88, 90 and 92 should be assembled from materials known in the art.

Figure 6:
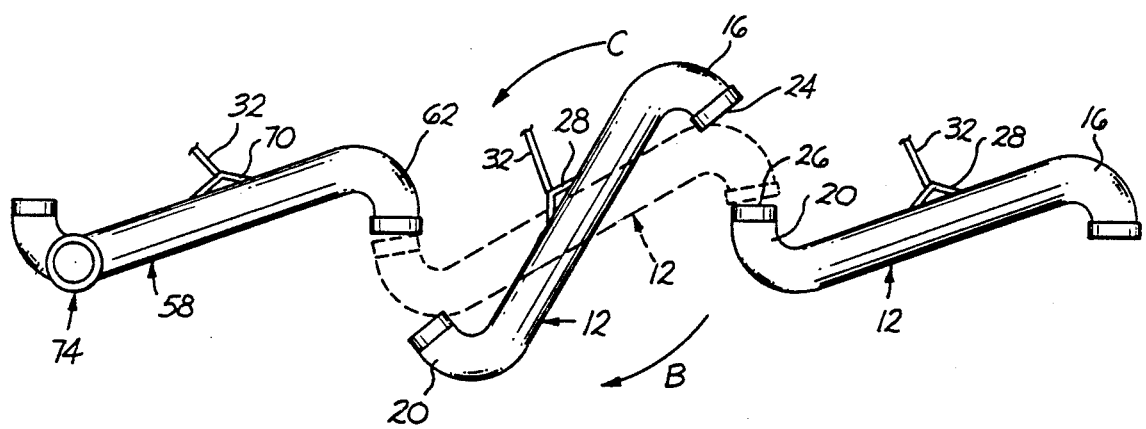
FIG. 6 is a side elevational view of a series of modules indicating how they are connected and disconnected.

FIG. 6 illustrates how the space utility conduit 10 is used. As illustrated, to install the utility conduit 10 the first module 12 is installed by connecting the attachment projection 28 to the connecting member 32 that in turn as illustrated in FIG. 1 is attached to the space structure 34. After this first module 12 is connected to the space structure 34, the next module 12 next to it has its attachment projection 28 connected to a connecting member 32 that is in turn connected to the space structure 34. This module 12 after its projection 28 has been rotatably connected to the space structure 34 via the connecting member 32 is rotated in the direction indicated by the arrow B so that the end 24 of the elbow shaped portion 16 is pushed down upon the end 26 of the adjacently located elbow shaped portion 20 of the adjacently located module 12 so that the module 12 moves as indicated by the dashed lines. This results in the connection of the connectors 36, 38, and 40 in the end 24 being connected to the connectors 52, 54 and 56 in the end 26 of the elbow shaped portion 20.

This procedure should be continued until all of the required modules 12 are interconnected. During this procedure, at various intervals or locations, the module 58 can be substituted for a module 12. This will be done where a utility service connector 76 is desired for connection to a servicing connector (not shown) located exterior to the space structure 34. The module 58 is connected in the same manner as the module 12.

During the installation procedure it will, of course, be necessary to exert force upon the module 12 or 58 to rotate it as indicated by the arrow in FIG. 6 so that its connectors meet with the connectors of the adjacent module 12 or 58. The ability to properly exert this force in an zero gravity or near zero gravity environment in space is made possible by the fact that the module 12 or 58 is rotatably connected to the space structure 34 by the connecting member 32 prior to the force being exerted. The lazy S-shaped configuration of the module 12 or 58 makes it possible to insert the module 12 or 58 in and around adjacent space structure 34 portions. This lazy S-shaped configuration also makes it possible, as illustrated by the arrow C in FIG. 6, to remove the module 12 or 58 for easy replacement or repair without disturbing any adjacent modules 12 or 58. This is accomplished by rotating the module 12 or 58 in the direction of the arrow C so that its end portions, such as the end portions 16 and 20 illustrated are separated from the respective adjacent end portions 20 and 62.

Although the invention has been described in considerable detail with reference to a certain preferred embodiment, it will be understood that variations or modifications may be made within the spirit and scope of the invention as defined in the appended claims.

What is claimed is:

1. A space utility conduit for use in a space structure comprising a plurality of substantially similar conduit segments having connecting means for enabling said conduit segments to be connected together, each of said conduit segments comprising at least two utility lines located within said conduit segment having connectors connected thereto, micrometeorite shielding associated with said conduit segment and means for connecting said conduit segment to said space structure.

2. The space utility conduit of claim 1 wherein said micrometeorite shielding is located within said conduit segments.

3. The space utility conduit of claim 2 further comprising means for gaining access to said utility lines from the exterior of said space structure.

4. The space utility conduit of claim 3 wherein said means for gaining access to said utility lines comprises an exterior connector.

5. The space utility conduit of claim 4 wherein said exterior connector is located on a conduit segment.

6. The space utility conduit of claim 5 wherein at least some of said conduit segments have a substantially lazy S-shape.

7. A space utility conduit for use in a space structure comprising a plurality of substantially similar conduit segments, each of said conduit segments comprising a substantially straight central portion with ends and elbow shaped end portions extending from the ends of the substantially straight central portion, connecting means located on the elbow shaped end portions for enabling the elbow shaped end portions to be connected together and space structure connecting means associated with said conduit segment for connecting said conduit segment to said space structure.

8. The space utility conduit of claim 7 wherein the elbow shaped end portions have open ends and the open end of the elbow shaped end portion extending from one end of the substantially straight central portion faces in a direction substantially opposite from the direction of the open end of the elbow shaped end portion extending from the other end of the substantially straight central portion.

9. The space utility conduit of claim 8 wherein said connecting means comprises means for rotatably connecting said conduit segment to said space structure.

10. The space utility conduit of claim 9 wherein each of said conduit segments have at least two utility lines with end portions and connectors connected to the end portions of said utility lines.

11. The space utility conduit of claim 10 wherein said connectors have means for preventing inadvertent connection to a non-compatible connector.

12. The space utility conduit of claim 10 further comprising at least one conduit segment having means for attachment of external structure located exterior to said space structure.

13. The space utility conduit of claim 12 wherein said means for attachment of external structure comprises a connector.

* * * * *